United States Patent [19]
Brookfield et al.

[11] 4,002,960
[45] Jan. 11, 1977

[54] TORQUE CONTROLLED TAPPING DEVICE

[75] Inventors: Richard A. Brookfield, Newton, Mass.; Karl R. Ritzinger, Manchester, N.H.

[73] Assignee: Brookfield Engineering Laboratories, Inc., Stoughton, Mass.

[22] Filed: May 1, 1974

[21] Appl. No.: 465,748

[52] U.S. Cl. .............................. 318/257; 318/432; 318/490; 318/480
[51] Int. Cl.² .......................................... B23Q 5/28
[58] Field of Search .......... 318/432, 434, 490, 463, 318/313, 258, 269, 39, 480

[56] References Cited
UNITED STATES PATENTS

| | | | |
|---|---|---|---|
| 3,371,257 | 2/1968 | Warren et al. | 318/39 |
| 3,371,258 | 2/1968 | Brown | 318/294 |
| 3,404,490 | 10/1968 | Estabrook | 318/432 X |
| 3,411,063 | 12/1968 | Schoonover | 318/326 X |
| 3,497,786 | 2/1970 | Lombardo | 318/269 X |
| 3,549,972 | 12/1970 | Callan | 318/327 |
| 3,699,411 | 10/1972 | Miller | 318/39 |

*Primary Examiner*—B. Dobeck

[57] ABSTRACT

A threading and/or tapping device has a housing including a tubular portion and a chamber portion that provides a shelf for a motor. A shaft rotatably connected to a slide within the tubular portion extends downwardly through the chamber portion with a tool holder on its exposed end. The slide is movable by the operator to advance and retract the shaft and a gear train within the chamber includes a drive gear on the motor shaft and a driven gear through the axis of which the tool holder shaft extends to rotate therewith and to slide relative thereto as the operator advances or retracts the shaft. The housing includes means for detachably attaching it with the work holder shaft either normal to or axially aligned with a support. Means are provided to maintain, by a tachometer feedback control, a selected motor speed and a trip is provided to interrupt the operation of the motor if a predetermined maximum torque is exceeded, the torque being visually presented to enable the operator to so control the advance of the tool that overcutting at its leading or trailing edges may be substantially eliminated by maintaining the torque within an optimum range.

8 Claims, 8 Drawing Figures

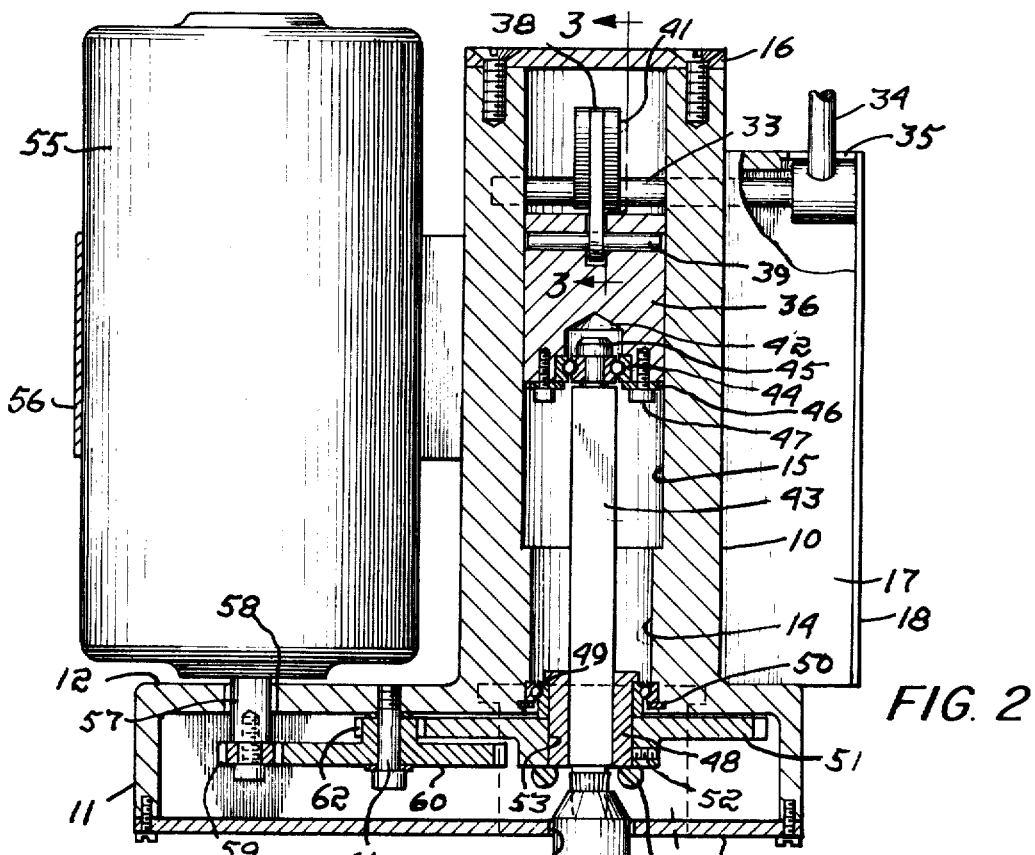
FIG. 2
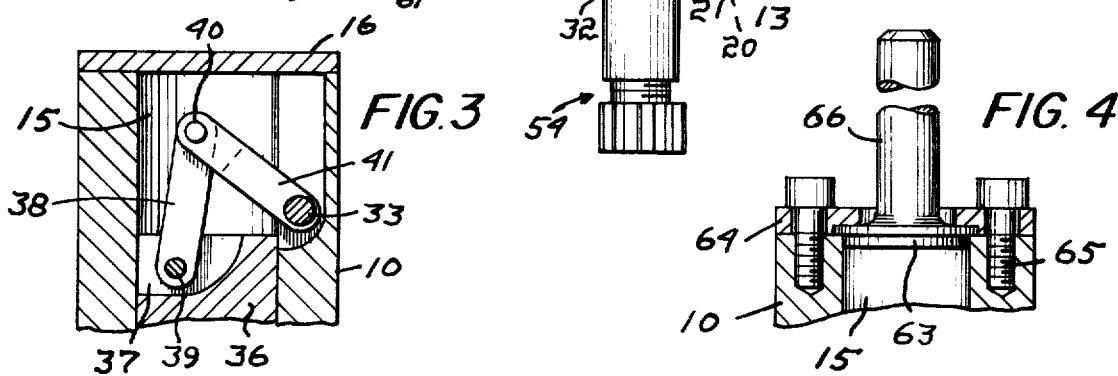
FIG. 3
FIG. 4
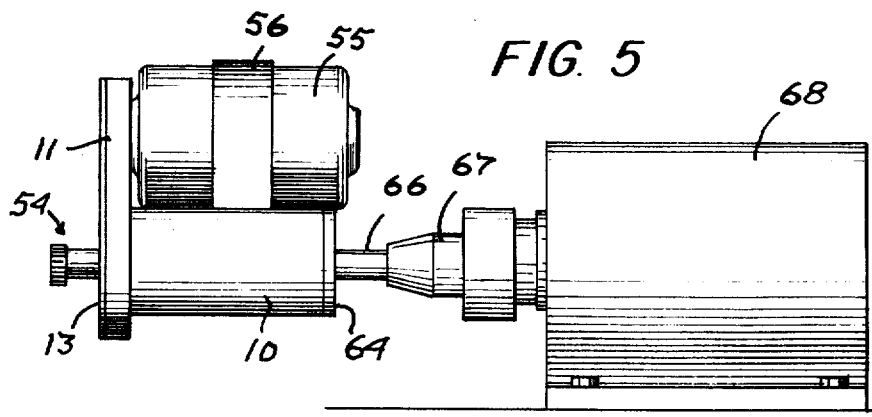
FIG. 5

TORQUE CONTROLLED TAPPING DEVICE

BACKGROUND REFERENCE

U.S. Pat. No. 3,371,258.

BACKGROUND OF THE INVENTION

Among the problems in the operation of threading or tapping devices are those concerned with the possible breakage of the tools and the cutting of off-size threads by the application of excessive torque to the tool.

It has long been recognized that minimum force is required on any specific combination of threading tool, either tap or die, when the minimum amount of material is removed, that is, if the dimensions of the threaded part are to be the same as the threading tool. To cut an oversized tapped hole or an undersized threaded diameter requires that more material than that exactly displaced by the tool be removed, absorbing extra work and requiring greater torque. It will be appreciated that if a tap, for example, is "pushed", it will overcut on the leading edge and if it is held back, it will overcut on the trailing edge of the thread producing, in either case, a greater torque, an offsize thread and a poor fit.

Release overload mechanisms are provided that may be set to provide a safe margin below the ultimate breaking strength of the tool. For example, if the breaking torque of a 10–24 Tap were to average 100 in. lbs., a standard setting would be 66 in. lbs. thus at least reasonably assuring that the release would be effective before a critical loading was reached. Such a setting reflects only the torsional strength of the tool and is not related to the actual force required to thread the particular material.

The advantages of visually presenting the cutting torque have been recognized in automatic lead screw tapping devices with the cutting torque visually presented and automatically limited.

THE PRESENT INVENTION

The principal objective of the present invention is to make it possible for the operator to control the advance of the tool in the work to prevent over or under cutting of threads within extremely close tolerances regardless of the work material or its thickness.

In accordance with the invention this objective is attained by providing a drive for the shaft to which the threading or tapping tool is attached, the drive having a direct current reversible motor that also drives a tachometer. First and second operator controlled circuits control the direction in which the motor runs, the first providing for a forward or thread-cutting rotation of the shaft and the second its reverse or retracting rotation. An over-current trip is provided, at least when the first circuit is closed, to halt the motor in the event the motor torque exceeds a selected maximum for a particular tool or a particular material, preferably with the relay of a photometer incorporated in the motor circuit so that the current across it is proportional to the motor armature current, a clamp that normally shunts the amplifier to ground but is disabled when either operator controlled circuit is closed and means disabling the first circuit and usually also the second circuit, when either is closed, in response to an over-current trip.

Yet another objective of the invention is to provide a brake for the motor, if no command signal therefore is present, an objective attained by providing a clamp energized whenever the motor amplifier is de-energized and itself energized by the reverse EMF of the motor and providing a time delay in its operation to ensure that the motor circuit amplifier is first shut before the brake is applied and the brake released before the amplifier is again turned on.

Another objective of the invention is to ensure smooth operation of the motor at low speeds, an objective attained by the use of an oscillator whose pulses are fed to the amplifier of a motor circuit together with the output of a differential amplifier and of a sufficiently high frequency to eliminate low speed cogging due to the coupling between the motor and the tachometer.

Another objective of the invention is to limit the inrush surges of the motor when it is first turned on, an objective attained by providing a time delay before the output of the differential amplifier is fully operative to effect the full speed operation of the motor, the time delay limiting the initial "turn on" voltage to a value that eliminates the possibility of false over-current trips.

And yet another objective of the invention is to provide that, once an over-current trip occurs, the tool cannot again be advanced until its direction has been reversed, an objective attained by providing that the over-current trip circuit includes a flip-flop operable to open the circuit by which the operation of the motor in an advancing direction is effected and by employing reset circuitry therefor that is energized only by operating the motor in the reverse or retracting direction.

Another objective of the invention is to provide that the reverse or retract speed of the motor may, at the operator's option, be at either a slow or fast rate, an objective attained with a lead provided with a potentiometer that, when the motor and accordingly the tachometer is operable in a reverse or retracting direction, shunts a portion of the tachometer signal to ground thus providing a retracting shaft speed greater than the forward or advance speed of the shaft unless an operator controlled switch in that lead is opened, a slower retracting speed then resulting.

Another objective of the invention is to provide a device that is mechanically adapted for light weight constructions that may be used as lathe or jig borer attachments.

In accordance with the invention, this objective is attained with a device having a housing including a tubular portion opening into a chamber portion that provides a shelf on which the motor is mounted with the shaft entrant of the chamber portion. A shaft within the tubular portion extends through the chamber portion and has a tool holder on its exposed end. The shaft is rotatably connected to a slide within the tubular portion and connected to the means by which the shaft is advanced or retracted. A gear train within the chamber portion includes a drive gear on the motor shaft and a driven gear through the axis of which the tool holder shaft extends in a manner enabling it to be slidable relative thereto, as the operator controls the advance of or retracts the tool, and to rotate therewith.

The objective enabling the device to be useable with jig borers and lathes is achieved by providing the device with a detachable connection between its chamber portion and the arm of a stand and by providing the end of the tubular portion remote from the chamber portion with a detachable cap that, when removed, may be replaced by a hub having a post coaxial with the work holder shaft and adapted to be clamped in a socket such as a lathe chuck.

BRIEF DESCRIPTION OF THE DRAWINGS

In the accompanying drawings, a preferred embodiment of a threading and tapping device in accordance with the invention is shown

FIG. 2 is a section, on an increase in scale, taken approximately along the indicated lines 2—2 of FIG. 1;

FIG. 3 is a fragmentary section taken approximately along the indicated line 3—3 of FIG. 2;

FIG. 4 is a similar section illustrating the attachment of an adapter to the device;

FIG. 5 is a side elevation of the device illustrating its attachment to a lathe chuck by the adapter;

THE PREFERRED EMBODIMENT OF THE INVENTION

Figure 1:
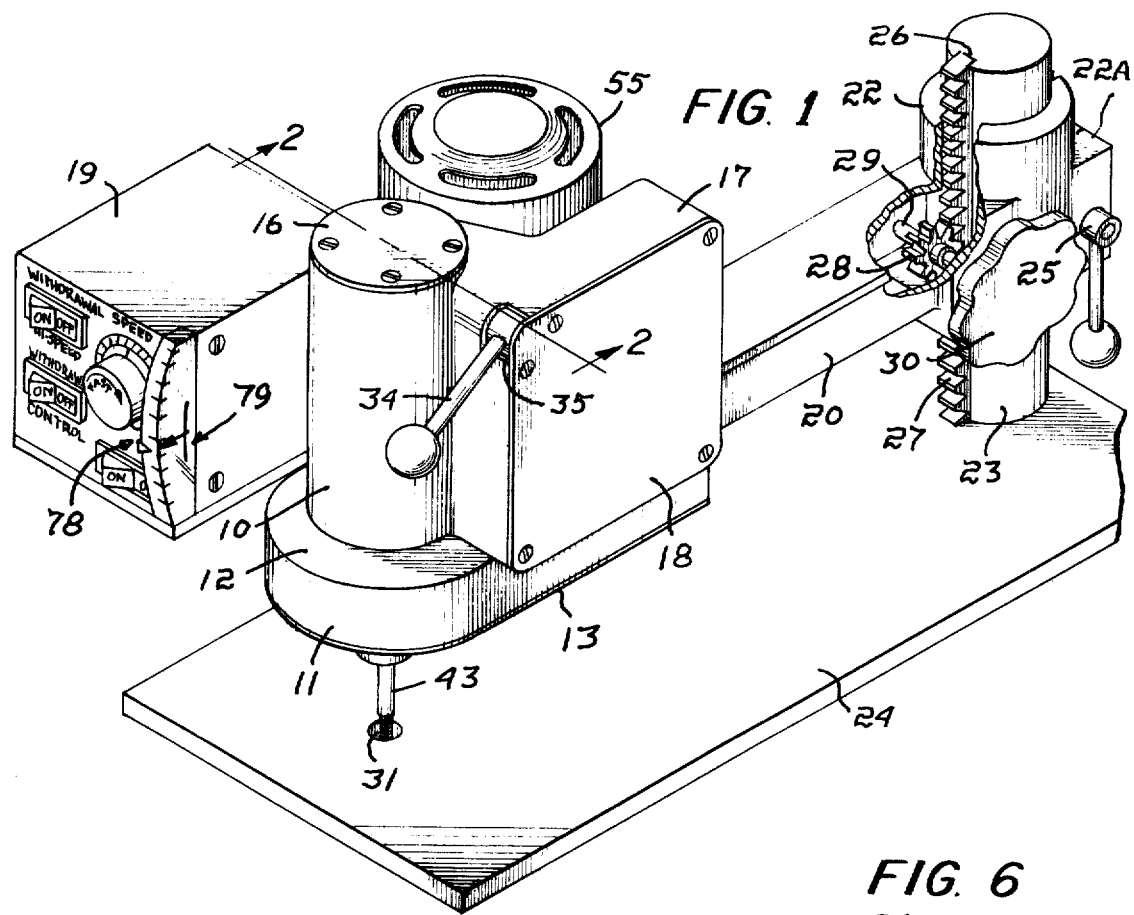
FIG. 1 is a perspective view of the device.

A tapping device in accordance with the invention is shown as having a housing including a tubular portion 10 and a shallow portion 11 extending laterally of the tubular portion 10 to provide a shelf 12 and closed by a detachable plate 13. The tubular housing 10 has a cylindrical bore 14 opening downwardly into its chamber portion 11 and upwardly into a relatively long counterbore 15 whose upper end is closed by a detachable cover 16. The housing also includes a compartment 17 for certain portions of the circuitry, later to be detailed, and having a side opening closed by a plate 18. A separate control box 19 is provided for the other portions of the circuitry.

As shown in FIG. 1, one end of an arm 20 of U-shaped section is detachably attached to the rear of the chamber portion 11 by bolts 21 and its other end has a split sleeve 22 whose bore is dimensioned to slidably receive a post 23 disposed vertically on a base plate 24 which sleeve is adapted to be locked thereto by a lock 25 threaded through the sleeve portions 22A. The post 23 has an axially extending channel 26 to receive an axially extending key in the form of a rack 27. The sleeve end of the arm 20 houses a pinion 28 meshing with the rack teeth and fast on one end of a shaft 29 provided at its other end with a knob 30 operable, depending on the direction it is turned, to raise or lower the arm 20 relative to the base plate 24. The plate 24 has a hole 31 in vertical alignment with the axis of the bore 14 and a hole 32 in the chamber plate 13.

A shaft 33, adjacent the upper end of the counterbore 15 extends transversely therethrough and into the compartment 17 and there has a control arm 34 fixed thereon which extends forwardly through a slot 35. A slide 36 fits the counterbore 15 and has a vertical slot 37 in its upper end, see FIG. 3, in which one end of a link 38 is secured by a pivot 39. The other end of the link 38 is connected by a pivot 40 to a crank arm 41 fast on the shaft 33 so that by raising or lowering the control arm 34, the slide 36 is pulled upwardly or lowered in the counterbore 15.

The lower end of the slide 36 has an axial socket 42 to freely receive the upper turned end of a square shaft 43 held axially by a ball bearing unit 44 whose inner race is held by a cap 45 on the turned end of the shaft and whose outer race is held by a washer 46 secured to the undersurface of the slide 36 by screws 47.

A flanged hub 48 is rotatably supported in the lower end of the bore 14 by a ball bearing unit 49 having its outer race secured in a counterbore 45 as by a retainer 50 and its inner race between the hub flange and a gear 51 secured to the hub 48 as by a set screw 52. The hub 48 has a square passage 53 slidably receiving the shaft 43 while enabling the hub and the shaft 39 to rotate together. The shaft 43 is provided with a tool holder of the chuck type and generally indicated at 54.

An electric motor 55 is secured to the housing as by a holder 56 and has its drive shaft 57 extending downwardly, parallel to the shaft 43 into the chamber portion 11 through a port 58 in the shelf 12. A drive gear 59, fast on the drive shaft 57 meshes with the larger gear 60 of a step gear rotatably mounted on a spindle 61 anchored in the shelf 12 with its smaller gear 62 in mesh with the driven gear, the gear 51.

From the foregoing, it will be apparent that with, for example, material held on the table 24 and having a bore to be threaded and with a tap of appropriate size secured by the tool holder 54, the operator can advance the tap by means of the control arm 34 to bring the rotating tap at the entrance of the bore and then continue its advance until the threading operation is completed. If desired, the operator may detach the housing from the supporting arm 20. After removing the cover 16, a flanged hub 63, see FIG. 4, is then inserted in the open end of the counterbore 15 which is dimensioned to fit with the flange resting on the end of the tubular portion 10. The clamping ring 64 is then anchored to the tubular portion 10 by screws 65, the clamping ring 64 being recessed to accommodate the flange of the hub 63. The hub 63 has an axial post 66 enabling it to be secured in the chuck 67 of a lathe tool holder 68, for one example.

Figure 6:
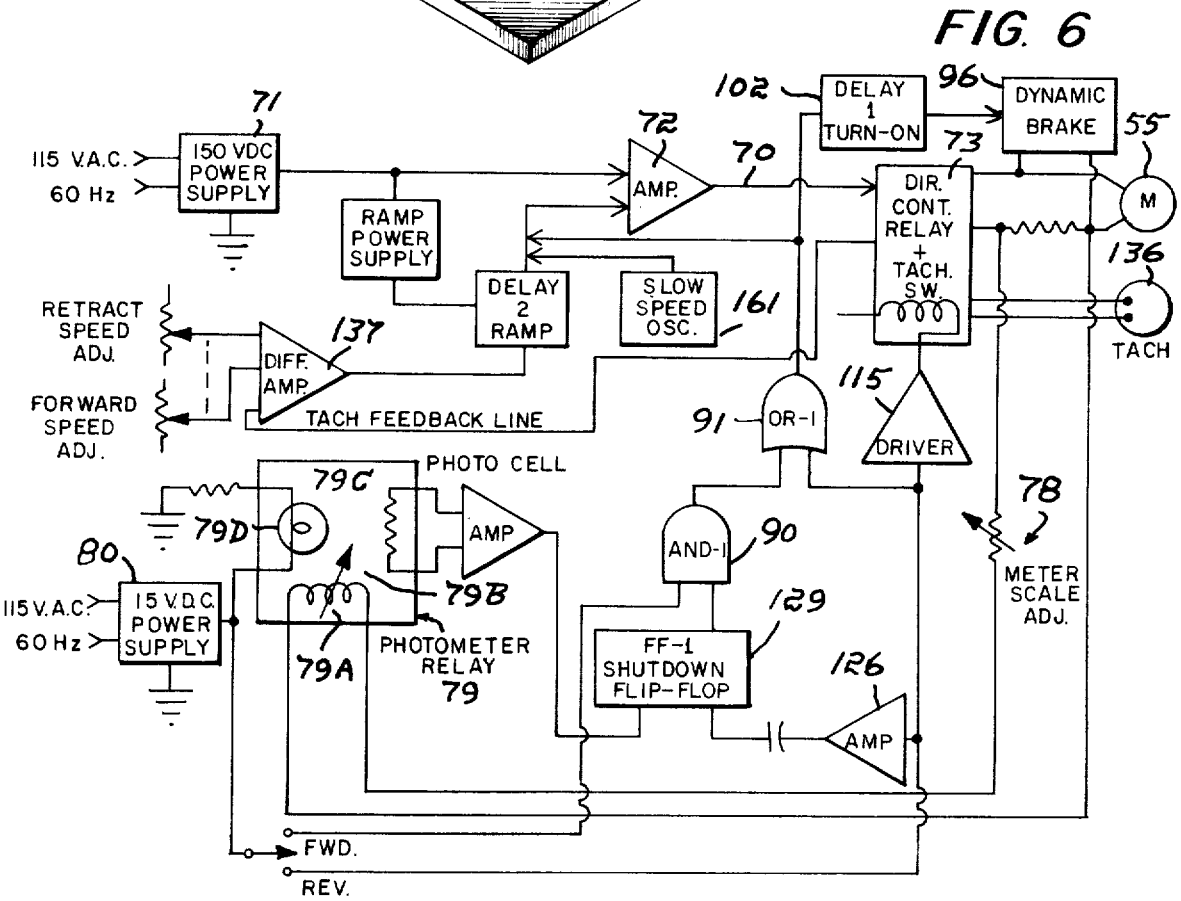
FIG. 6 is a block diagram of the circuitry.
Figure 7A:
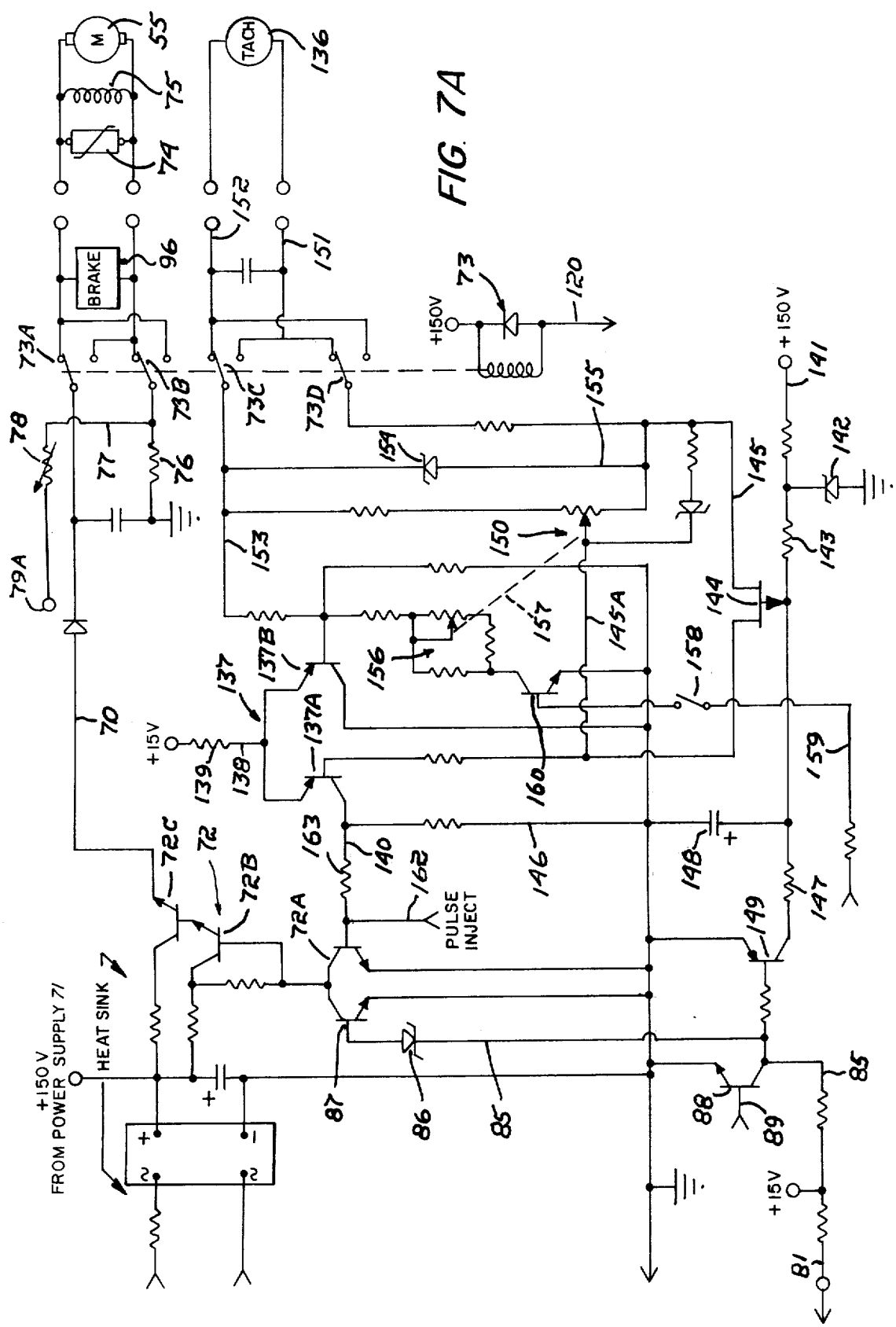
FIGS. 7A and 7B are schematic views thereof.

The motor 55 is reversible, direct current motor and its lead 70 from a power supply 71 (FIG. 6), for example, a 150V source, is provided with a DC amplifier, generally indicated at 72 and of the Darlington type, the switches 73A and 73B of a relay, generally indicated at 73 and operable to effect the reversing of the motor 55 in a conventional manner, and a clamp 74 see FIG. 7A to hold voltage spikes to a predetermined maximum. The field of the motor is indicated at 75 in FIG. 7A. On the ground side of the motor the lead 70 has a resistor 76 and a lead 77 provided with an adjustable control 78 and connected to the relay 79A of a generally indicated light meter 79 of the type, see FIG. 6, having a light shield or vane 79B movable by the relay 79A to block the cell 79C from the lamp 79D when the intensity of the light increases to a predetermined maximum that represents a predetermined maximum motor armature current which is a measure of the torque. The voltage across the resistor 76 is directly proportional to the armature current.

Figure 7B:
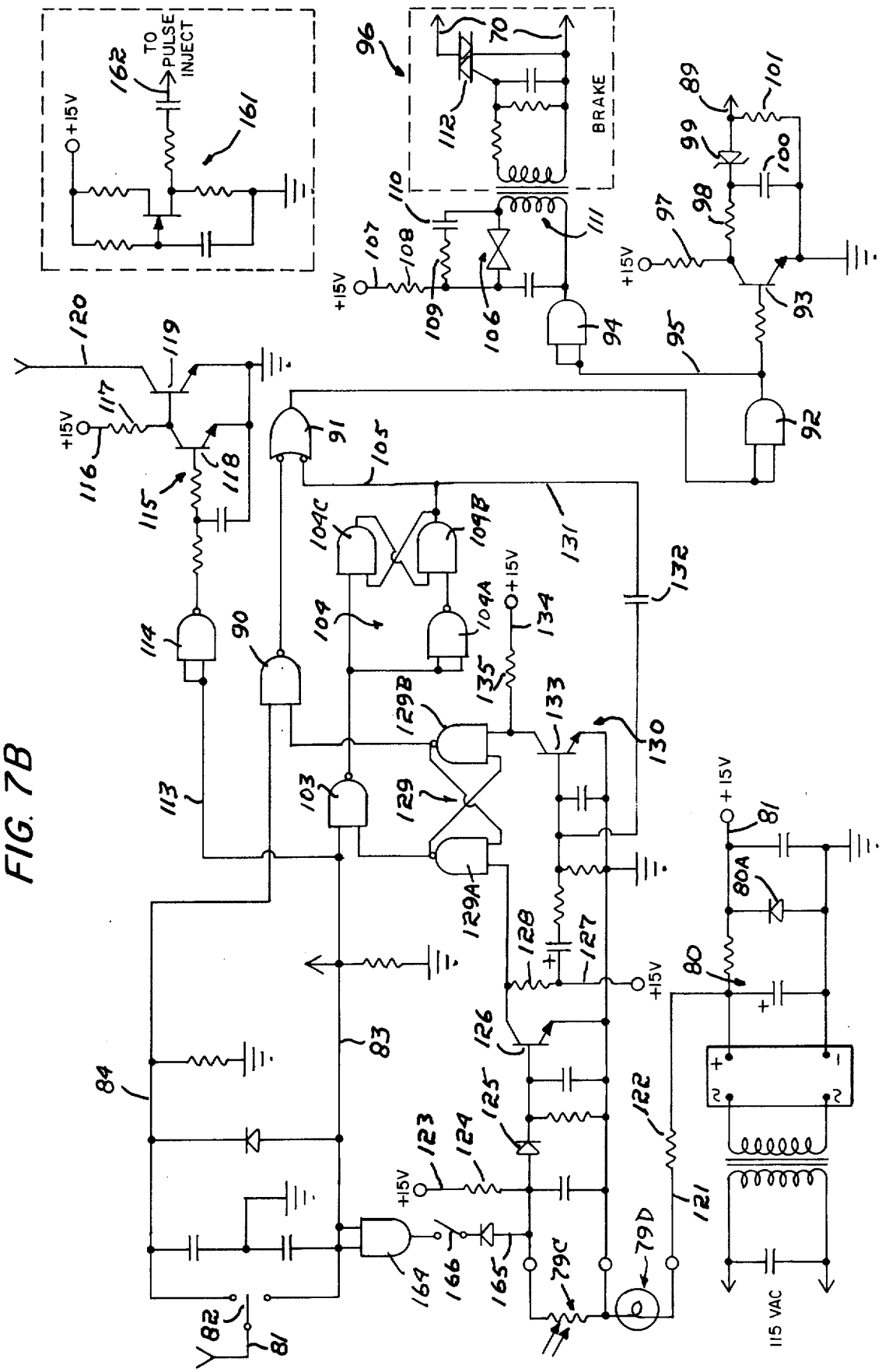

A second power supply 80, see FIG. 7B, regulated by the Zener diode 80A to provide a selected output for the control circuitry of, say, 15 Volts, has a lead 81 including a manually operable switch 82 having a neutral position, a retracting or reverse position in control of a lead 83 and an advance of forward position in control of the lead 84.

A lead 85, see FIG. 7A, from the power supply 80 includes a Zener diode 86 to provide noise immunity and a clamp transistor 87 driven by transistor 88 in a lead 89 and in control of the amplifier 72 which includes transistors 72A, 72B, and 72C. The transistor 87 is subject to being energized when the transistor 88 is turned on as it is if the switch 82 is in its neutral position or if there is an over-current trip, thereby shunting the transistor 72A to ground and de-energizing the motor amplifier 72.

When the switch 82 is in its forward or advance position, the lead 84 is closed and it includes gates 90, 91, 92, and a clamp 93 in control of the lead 89 and a gate 94 in a branch 95, the gate 94 holding a generally indicated motor brake 96 inoperative. The lead 89 is connected to the power source 80 and has a resistor 97 and is grounded when the transistor 93 is turned on. The lead 89 includes a resistor 98 and a Zener diode 99 with a capacitor 100 and a resistor 101. The resistors 97 and 98 and the capacitor 100 provide a time delay to insure that the brake 96 is off before the motor 55 is turned on or that the motor is turned off before the brake 96 is applied. The thus established time delay is sometimes referred to as the first time delay and is generally indicated at 102 in FIG. 6.

When the switch 82 is set in its retract or reverse position, the lead 83 is closed. The lead 83 includes a gate 103, a squaring amplifier, generally indicated at 104 comprising gates 104A, 104B, and 104C and the gate 91 to which it is connected by the lead 105. Accordingly, as long as the switch 82 is set to require motor operation in one direction or the other, or unless there is an over-current trip, the clamp 93 is operative to turn on the transistor 88 with the consequence that the amplifier 72 is operative to provide motor current.

As stated, the gate 94 blocks the operation of the brake 96 by blocking the operation of a pulse generator 106 in a lead 107 from the power source 80 and having a resistor 108. A resistor 109 and capacitor 110 provide a noise filter to prevent false triggering of the brake 96. A transformer 111 provides that the output of the pulse generator 106 are pulses appropriate to trigger a triac switch 112 which is a latching device and is connected across the leads 70 of the motor 55 to present a dead short across its armature 75. The asymetrical delay, provided by the resistors 97 and 98 and the capacitor 100 ensures that the braking effect will not occur until a few microseconds after the "turn off" signal reaches the amplifier 72 and that the "turn on" signal will not reach the amplifier until the brake 96 is released thereby to prevent shorting the output of the amplifier 72. Whenever the amplifier 72 is shut down, either by the neutral position of the switch 82 or because of an over-current trip, the triac switch 112 is conductive and the reverser EMF of the motor 55 provides a conducting current that quickly halts the motor. When the motor 55 stops, there in no longer any such holding current and the triac switch 112 stops conducting. The triac switch 112 is bi-directional and functions for either polarity of the motor back EMF.

The lead 83 also includes a branch 113 provided with a gate 114 in control of a driver, generally indicated at 115, for the relay 73. The relay driver 115 is shown as including a lead 116 from the power source 80, a resistor 117 and transistors 118 and 119, the transistor 118 controlled by the gate 114 and the transistor 119 operable to close the relay lead 120 from the power source 71, once the lead 83 is closed. Unless the relay 73 is thus energized, its switches 73A and 73B connect the motor leads to cause the motor 55 to operate in a forward or advance direction but whenever the relay 73 is energized, the switches 73A and 73B are shifted to reverse the direction in which the motor 55 operates, as is conventional.

Turning now to the over-current trip control of the motor 55, it will be seen that the power supply 80 has a lead 121 including a resistor 122 and the lamp 79D of the photo meter relay 79 and a lead 123 provided with a resistor 124 and including the cell 79C of the photo meter relay, a diode 125 and an amplifier 126 in control of a lead 127 from the power source 80 and provided with a resistor 128 and a flip-flop, generally indicated at 129 and comprising the gates 129A and 129B. When the vane 79B blocks light from the lamp 79D, the resulting signal is amplified and triggers the flip-flop to disable the gates 90 and 92 whereby the clamp transistor 87 is operative to interrupt the operation of the motor 55 as the over-current trip results in the transistor 88 being turned off through the transistor 93.

The flip-flop 129 can be reset only by setting the switch 82 to close the lead 83 to effect reverse or retract motor operation thereby preventing "forward" jogging of the tap or other tool after a current trip. The lead 83 then operates the squaring amplifier 104 to generate a fast wave form to operate the generally indicated reset 130 to which it is connected by the lead 131 having a capacitor 132. The reset 130 includes a transistor 133 which, when turned on, grounds the lead 134 having a resistor 135 and connected to the power source 80.

From the foregoing, it will be apparent that the direction of the motor and its operation are subject to manual control by the operator and the motor is subject to automatic control in the event of over-current trips whenever the armature current exceeds a level selected as the maximum torque that can be tolerated for a particular tool and the particular material. As the meter relay is exposed, the torque load may be observed by the operator so that he can readily prevent "pushing" or "holding back" either of which would result in off-size work.

Turning again to the motor drive, it will be seen from FIG. 7A that the motor drives a tachometer 136 and that the relay 73 includes switches 73C and 73D operable with the switches 73A and 73B to reverse its leads.

As stated earlier, the motor 55 is driven by the amplifier 72 which receives its operating signal from a differential amplifier, generally indicated at 137 having a lead 138 from the power source 80 and provided with a resistor 139 and differentially connected transistors 137A and 137B. The output of the amplifier 137 is the lead 140 connected to the base of the transistor 72A of the amplifier 72. The amplifier 137 has the function of comparing tap speed settings with the voltage feedback from the tachometer 136 and provides a larger signal to the amplifier 72 to increase the motor voltage as the motor speed drops and vice versa.

A lead 141 connected to the power source 71 regulated by a Zener diode 142 has a resistor 143 and provides gate voltage of, say 24 Volts for a transistor 144 in control of a lead 145 providing a direct path for feedback from the tachometer 136 to the transistor 137A. The lead 141 includes a branch 146 and a resistor 147 and the branch 146 has a capacitor 148 to provide a time delay to limit the initial gate voltage of the transistor 144 to a small level which keeps it turned on thus applying full tachometer voltage to the amplifier 137. This voltage is controlled by a transistor 149 which is turned off any time the switch 82 is set in a lead-closing position and no over-current trip has occurred. When the transistor 149 is turned off, the voltage on the gate of the transistor 144 is "ramped up" at a rate controlled by the resistor 143 and the capacitor 148 to shut off the transistor 144 thus allowing the full tachometer voltage to be applied to the amplifier 137 only during startup, thus providing a slow speed start. The resistor 147 in the lead 141 allows for a quick discharge of the capacitor 148 when the switch 82 is in its "off" position and in the case of an over-current trip. The "ramp up" rate is chosen so as to limit armature current inrush on start up to a value that will not trip the over-current motor relay 79A.

The lead 145 has a branch 145A to a potentiometer 150 connected to the base of the transistor 137A and is connected to the tachometer lead 151 by the relay switch 73D in the normal position of the relay 73 with the tachometer lead 152 then connected to the lead 153 by the relay switch 73C. A clamp 154 in a lead 155 is provided to eliminate high voltage spikes induced in the tachometer. As the voltage feedback from the tachometer 136 varies, so does the signal from the transistor 137A thereby to vary the drive of the motor 55 in either direction it is operated.

When the switch 82 is set in its "up" or retract position, the motor current is controlled by the potentiometer 156. The potentiometers 150 and 156 are ganged together as indicated at 157 to make the reverse speed greater than the forward speed but proportional thereto, desirably in the range of 1:1 to 5:1. The reverse speed control may be overridden by opening the switch 158 in the branch lead 159 of the direction control lead 83. The lead 159, when open, shuts off the transistor 160 which would otherwise provide a shunt to ground for a portion of the tachometer signal to provide high speed operation of the motor 55 during reverse mode.

In order to ensure adequate low speed stability and thereby prevent low frequency cogging due to the connection between the motor and the tachometer, a low speed stability oscillator, generally indicated at 161 is provided with a lead 163 connected to the output lead 140 between the resistor 163 and the transistor 72A of the amplifier 72. As the oscillator 161 is conventional, it is not detailed other than to note that the pulse train, in practice, has a frequency in the order of 2 KHz which is effectively integrated by the motor time constant, providing smooth, low speed operation.

If it is desired not to limit the retract current, a gate 164 in lead 165 controlled by a manually operable switch 166 connects the meter relay output 79A to ground thereby preventing the operation of the flip-flop 129 by that output.

From the foregoing, it will be apparent that once the operator has set the rheostat 150 to provide a desired tap speed, desirably close to the lower limit of the speed range appropriate for the particular material and tap size being used, that speed will be maintained unless the torque exceeds the value for which the meter scale has been set thereby causing an over-current trip. As the meter is desirably observable to the operator, he can watch it and can easily control the advance of the tap to avoid cutting oversize threads even with materials that are thin and relatively soft.

We claim:

1. A device for threading or tapping work, said device comprising a shaft including means to detachably secure a threading or tapping tool thereto, a drive connected to said shaft and including a reversible D.C. motor, a tachometer driven by said motor, means connected to said shaft and operable by the operator to advance or retract said shaft relative to the work, a motor circuit including an amplifier, operator controlled circuits, each operable to effect a selected direction of shaft rotation, a speed control including a feedback from the tachometer and operable to regulate the amplifier output inversely to the motor speed thereby to maintain a substantially constant, selected motor speed, at least when the shaft is turning in a thread-cutting direction, means responsive to the motor torque and including a meter presenting measurements of the torque to the operator for his guidance in the use of the operator controlled means and operable, if the torque reaches a preselected maximum, to effect the shutdown of said amplifier, at least when the motor is operated to drive the shaft in a thread-cutting direction, and means operable to energize the motor circuit amplifier to shunt it to ground and normally maintaining said amplifier deenergized, a brake for said motor, means to operate said brake and normally maintaining said brake applied, operator controlled circuits include common means in control of said amplifier operating means and said brake operating means and operable when either is energized to effect the energization of the amplifier and the release of the brake.

2. The device of claim 1 in which the amplifier shunting means includes an asymetrical delay operable to delay the application of the brake when the amplifier is shunted and a delay in the energization of the amplifier when the brake is released.

3. The device of claim 1 in which the torque responsive means includes a photometer of the type including a relay and a shield movable thereby as the current across the relay increases to a predetermined value at which the shield blocks the cell from the light source, means so include the relay in the motor circuit that the current across the relay is proportional to the motor armature current, and a shut-down circuit includes means operable to effect the shut-down of the motor circuit amplifier and said shut-down circuit also includes means controlled by the photometer to be operative only when said armature current reaches said predetermined maximum.

4. The device of claim 1 in which the speed control includes means operable when the operator controlled circuit is closed that effects shaft rotation in a tool-retracting direction, to provide an amplifier output that establishes a higher motor speed than when the motor is operated to rotate the shaft in a thread-cutting direction.

5. The device of claim 1 and means to prevent the operation of the motor to rotate the shaft in a thread-cutting direction after an over-current trip by the torque responsive means until the operator controlled circuit is closed by which the direction of the motor is reversed.

6. The device of claim 5 and means in control of the output of the speed control to limit the initial output of the motor circuit amplifier when an operator controlled circuit is closed.

7. The device of claim 5 in which the operator controlled circuit by which the motor is driven in a thread-cutting direction includes a gate, the torque responsive means includes a flip-flop operable to disable said gate, and the operator controlled circuit by which the motor is driven in a retracting direction includes means to reset said flip-flop.

8. The device of claim 1 in which the tachometer feedback includes a transistor, and a lead providing gate voltage therefor includes a transistor turned off when the motor is operating in either direction unless there is an over-current trip and first and second resistors, and a grounded branch lead between said resistors and including a capacitor, said first resistor and said capacitor providing maximum initial output of the differential amplifier with the motor current provided by the motor circuit amplifier than at a level preventing an over-current trip and said second resistor providing for the quick discharge of said capacitor when the transistor is turned on.

* * * * *